No. 749,634.                                         Patented January 12, 1904.

UNITED STATES PATENT OFFICE.

BRUNO RICHARD SEIFERT, OF RADEBEUL, GERMANY, ASSIGNOR TO CHEMISCHE FABRIK VON HEYDEN, AKTIEN-GESELLSCHAFT, OF RADEBEUL, NEAR DRESDEN, GERMANY.

ACETYL PARA CRESOTINIC ACID.

SPECIFICATION forming part of Letters Patent No. 749,634, dated January 12, 1904.

Application filed September 1, 1903. Serial No. 171,541. (Specimens.)

*To all whom it may concern:*

Be it known that I, BRUNO RICHARD SEIFERT, a subject of the King of Saxony, and a resident of Radebeul, near Dresden, in the Kingdom of Saxony, German Empire, have invented a new and useful Composition of Matter, which is Acetyl Para Cresotinic Acid, of which the following is a specification.

Since the year 1869 (Kraut, *Annalen der Chemie und Pharmacie*, Vol. 150, pp. 10-12) it is already known that by the action of acetylizing means, such as acetyl chlorid on salicylic acid, the latter is converted into acetyl salicylic acid. Kraut's description of the acetyl salicylic acid, which can be very easily obtained by means of his process, is not quite correct in several points, because he has recrystallized from water the acetyl salicylic acid obtained by him and then has described the properties of this product recrystallized from water. This product, however, was doubtless contaminated with a small quantity of free salicylic acid, which always originates when acetyl salicylic acid is boiled with water.

Acetyl salicylic acid is lately often used as a medicament in the place of sodium salicylate and salicylic acid. In the human body it splits into acetic acid and salicylic acid. Its physiological and therapeutical action is therefore identical with that of salicylic acid. However, its action on the digestive organs seems to be less injurious than that of the free salicylic acid; but like salicylic acid it has undesirable by-effects on the heart. Now I have found that when acetylizing para cresotinic acid a product is obtained which acts like acetyl salicylic acid, but has not the undesirable by-effects on the heart or at least shows them in a considerably lower degree. By treating para cresotinic acid with acetylizing means I obtain a new body hitherto unknown—*i. e.*, acetyl para cresotinic acid of the formula

or

In producing the new compound I can proceed as follows, (without limiting myself to the particulars given:) two parts of para cresotinic acid and three to four parts of acetic anhydrid are kept for some time at a boiling temperature in a reflux. The solution when cooling down solidifies to a white crystal magma, which is filtered, washed, and recrystallized from alcohol.

Para cresotinic acid may also be acetylized by employing diluting means which have no part in the reaction—for instance, benzene, tetra chlorid of carbon, &c.—by using condensing means hastening the reaction—for instance, sulfuric acid, pyridin, other bases, &c.—and also by employing acetyl chlorid instead of acetic anhydrid.

Recrystallized from alcohol acetyl, para cresotinic acid forms white needles of the melting-point 146° centigrade. With ferric chlorid it yields no blue coloring if absolutely free of para cresotinic acid; but if it still contains a trace of para cresotinic acid blue coloring will appear on addition of ferric chlorid. By this color reaction it is easily to be proved that acetyl para cresotinic acid, like acetyl salicylic acid, when boiled with water is partly split into acetic acid and para cresotinic acid.

Acetyl para cresotinic acid is soluble in methyl- and ethyl-alcohol, acetone, chloroform, crystallized acetic acid, benzene, and ether, chiefly when heated, and practically insoluble in water. It has a slightly-acidulous taste and is free of smell.

Acetyl para cresotinic acid has therapeutical properties. It may be administered internally in doses of five to ten grains as a remedy for headache and rheumatism.

Having now described my invention and in what manner the same is to be performed, what I claim as new, and desire to secure by Letters Patent, is—

As a new article of manufacture the acetyl para cresotinic acid having the formula

or

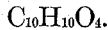

being if crystallized from alcohol in the shape of white needles, soluble in wood alcohol, alcohol, acetone, chloroform, ether, benzene, melting at about 146° centigrade, yielding if absolutely free of para cresotinic acid no blue color on addition of ferric chlorid, being split into acetic acid and para cresotinic acid by boiling water, having a slightly-acid taste, substantially as hereinbefore described.

In testimony that I claim the foregoing as my invention I have signed my name, in presence of two witnesses, this 18th day of August, 1903.

BRUNO RICHARD SEIFERT.

Witnesses:
  RUD. BENNIDT,
  PAUL E. SCHILLING.